United States Patent
Jordan (10) Patent No.: US 7,350,235 B2
(45) Date of Patent: Mar. 25, 2008

(54) DETECTION OF DECRYPTION TO IDENTIFY ENCRYPTED VIRUS

(75) Inventor: Myles Jordan, Melbourne (AU)

(73) Assignee: Computer Associates Think, Inc., Islandia, NY (US)

( * ) Notice: Subject to any disclaimer, the term of this patent is extended or adjusted under 35 U.S.C. 154(b) by 786 days.

(21) Appl. No.: 09/905,533

(22) Filed: Jul. 14, 2001

(65) Prior Publication Data

US 2002/0091934 A1 Jul. 11, 2002

Related U.S. Application Data

(60) Provisional application No. 60/218,926, filed on Jul. 14, 2000.

(51) Int. Cl.
*G06F 11/30* (2006.01)
*G06F 12/14* (2006.01)
*G08B 23/00* (2006.01)

(52) U.S. Cl. .................... 726/24; 713/187; 713/188

(58) Field of Classification Search .......... 713/200, 713/188, 187; 726/24
See application file for complete search history.

(56) References Cited

U.S. PATENT DOCUMENTS 5,765,030 A * 6/1998 Nachenberg et al. ......... 714/33
5,826,013 A * 10/1998 Nachenberg ................. 726/22
5,842,002 A * 11/1998 Schnurer et al. ............. 703/21
6,357,008 B1 * 3/2002 Nachenberg ................ 713/200
6,971,019 B1 * 11/2005 Nachenberg ................ 713/188
7,069,583 B2 6/2006 Yann et al. .................... 726/4
7,069,589 B2 6/2006 Schmall et al. .............. 726/24
7,210,040 B2 4/2007 Jordan ........................ 713/187
2002/0073330 A1 6/2002 Chandnani et al. ......... 713/200
2002/0083334 A1 6/2002 Rogers et al. .............. 713/200
2002/0091934 A1 7/2002 Jordan ........................ 713/188

* cited by examiner

*Primary Examiner*—Emmanuel L. Moise
*Assistant Examiner*—Michael Pyzocha
(74) *Attorney, Agent, or Firm*—Baker Botts L.L.P.

(57) ABSTRACT

A method of detecting decryption of encrypted viral code is provided. Executable code in a subject file is emulated by a code emulator. A memory monitor monitors memory access information supplied by the emulator. A memory area that is read during emulation of an instruction in the code is flagged. Modification to the flagged memory area which was read is determined. The memory monitor determines whether a memory region that is contiguous with the modified memory area, and then updates the memory region to encompass the modified memory area. The memory monitor also determines whether the updated memory region is larger than a predetermined size to trigger viral detection. The detection method may be embodied in a computer system, in a computer program (or some unit of code) stored on a computer readable medium, such as a floppy disk, CD, DVD, etc., and/or transmitted via a network, such as the Internet, or another transmission medium.

14 Claims, 4 Drawing Sheets

DETECTION OF DECRYPTION TO IDENTIFY ENCRYPTED VIRUS

CROSS-REFERENCE TO RELATED APPLICATIONS

This application claims the benefit of co-pending provisional application Ser. No. 60/218,926, filed Jul. 14, 2000 and entitled "DETECTION OF DECRYPTION TO IDENTIFY ENCRYPTED VIRUS."

TECHNICAL FIELD

The present disclosure relates to the detection of computer viruses. More specifically, the present disclosure relates to detecting encrypted viral code.

DESCRIPTION OF THE RELATED ART

Computer viruses are a major problem in modern day computing. Generally, a computer virus is a computer program or some unit of computer executable code, e.g., instructions to which a computer responds, such as a code block, code element or code segment. When the viral code is executed on a computing device, it typically attaches to other programs or sets of computer instructions and/or replicates itself. In this way, the virus exists within and "infects" otherwise normal programs. Another typical objective of a computer virus is to perform unsolicited actions on the target computer, without the knowledge and authorization of the computer user, and thereby perform unwanted, and also possibly harmful, actions on components of the computer and/or information stored on the computer.

Some viral code may cause damage to an infected computer and/or information stored on the computer, or prevents the computer from being used in its normal manner. For example, some viruses alter or destroy data or program files stored on, for example, the hard drive of the infected computer, which typically results in considerable downtime for the computer. Additionally, in some instances the integrity of an organization's computer database(s) is attacked, and the organization, without notice of the data corruption, continues operation using inaccurate data. Even if corrupted data is detected, the organization often has to, upon discovery of the problem, take time to recover its database before it may continue its normal operation.

Frequently, the viral code resides in a file containing computer executable code comprising a collection of computer instructions. Each time the infected code runs on a computing device/system, the virus code has the opportunity to spread and do its damage on the device/system. For example, the virus may spread by adding itself to computer executable code in some other program on a computer, then changing the preexisting code in such a way that the newly added viral code may be executed to further replicate itself in yet another program. Infected programs can exist anywhere in the computer system or even the operating system itself, and if not detected can cause potentially devastating problems.

The virus also may spread from one computer file to another, and from one machine to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

Assorted techniques have been proposed to detect and/or foil viruses. One such technique involves scanning suspected files or programs for known virus signatures or byte strings. A virus signature is a pattern of (not necessarily sequential) characters or instructions that is found in each instantiation of the associated virus. A virus scanner searches potential host files or programs for a set of one or more signatures that are indicative of particular known viruses. The scanning is performed by a separate program external to the files or programs being examined. Another technique is emulating and heuristically analyzing the execution flow of the potentially infected code. A combination of these may be used as well.

Searching for virus strings inside infected files, however, is rarely successful against newer viruses because programmers who create computer viruses now usually employ obfuscation techniques to protect their viral code from anti-virus scanners. One common obfuscation technique is virus code encryption. The virus code in its encrypted form may be attached to or inserted in a file or program. Frequently, the target of the encrypted viral code is a program file containing computer executable code comprising a collection of computer instructions. Each time the infected code runs, the encrypted virus code is decrypted in memory using a decryptor before control is transferred to the decrypted virus code. The encryption technique may vary from one generation of the virus to another generation so that the byte stream of each new viral infection is different from its predecessor.

There is a need to detect encrypted viral code in order to more successfully protect against the newer generations of computer viruses which use encryption to obfuscate scanning or other conventional viral detection techniques.

SUMMARY

The present disclosure provides a method of detecting decryption of encrypted viral code in a subject file. In accordance with one embodiment, the method includes emulating computer executable code in the subject file, flagging a memory area that is read during emulation of a first instruction in the computer executable code, and detecting a modification to the flagged memory area during emulation of a second instruction in the computer executable code.

The present disclosure provides, in accordance with another embodiment, a method of detecting encrypted viral code in a subject file, that includes emulating computer executable code in a subject file, maintaining a list of memory regions that have been read and modified during the emulation, determining whether a memory area is read during emulation of a first instruction in the computer executable code and whether the memory area is modified during emulation of a second instruction in the computer executable code, updating the list of memory regions to include the modified memory area, and triggering a viral detection alarm, if one of the listed memory regions is larger than a predetermined size. Preferably, the emulation of the computer executable code is performed on an instruction-by-instruction basis. However, other known emulation methodologies may be employed in the methods according to the present application.

In accordance with another embodiment, the method described above may include determining whether a selected one of the listed memory regions overlaps the modified memory area, and updating the selected memory region to encompass the modified memory area if an overlap exists. Alternatively, the method may include determining whether a selected one of the listed memory regions is contiguous with the modified memory area, and updating the selected memory region to encompass the modified memory area if one of the listed memory regions is found to be contiguous with the modified memory area. The method may further include determining whether the modified memory area overlaps the listed memory regions, and add the modified memory area as a new memory region to the list of memory regions if the modified memory area does not overlap any of the listed memory regions.

The present disclosure also provides an apparatus for detecting decryption of encrypted viral code in a subject file. The apparatus includes a code emulator and a memory monitor. In accordance with one embodiment, the code emulator emulates computer executable code in the subject file, and outputs memory access information associated with the emulation. The memory monitor monitors the memory access information output by the code emulator, flags a memory area that is read during the emulation of a first instruction in the computer executable code, and detects a modification to the flagged memory area during emulation of a second instruction in the computer executable code.

The present disclosure provides, in accordance with another embodiment, an apparatus for detecting encrypted viral code in a subject file, including a code emulator and a memory monitor. The code emulator emulates computer executable code in a subject file instruction-by-instruction, and outputs memory access information associated with the emulation. The memory monitor monitors the memory access information output by the code emulator, maintains a list of memory regions that have been read and modified during the emulation, determines whether a memory area is read during emulation of a first instruction in the computer executable code and whether the memory area is modified during emulation of a second instruction in the computer executable code, updates the list of memory regions to include the modified memory area, and triggers a viral detection alarm, if one of the listed memory regions is larger than a predetermined size.

In accordance with another embodiment, the memory monitor may determine whether a selected one of the listed memory regions overlaps the modified memory area, and updates the selected memory region to encompass the modified memory area if there is an overlap. Alternatively, the memory monitor may determine whether a selected one of the listed memory regions is contiguous with the modified memory area, and updates the selected memory region to encompass the modified memory area if they are contiguous.

BRIEF DESCRIPTION OF THE DRAWINGS

The features of this disclosure would be more readily understood from the following detailed description by referring to the accompanying drawings wherein.

DETAILED DESCRIPTION

This disclosure provides methodologies for detecting encrypted viral code in program and/or files (such programs and/or files are also referred to herein as "subject files"), by detecting decryption of such code during emulation of the code on a computing device or system. Since the detection of the decryption of code does not rely upon recognizing the content or signature of viral code, the detection methodologies contemplated by the present disclosure should not be susceptible to circumvention by disguised or obfuscated code. Thus, a more effective method of detecting encrypted viral code is provided.

Figure 4:
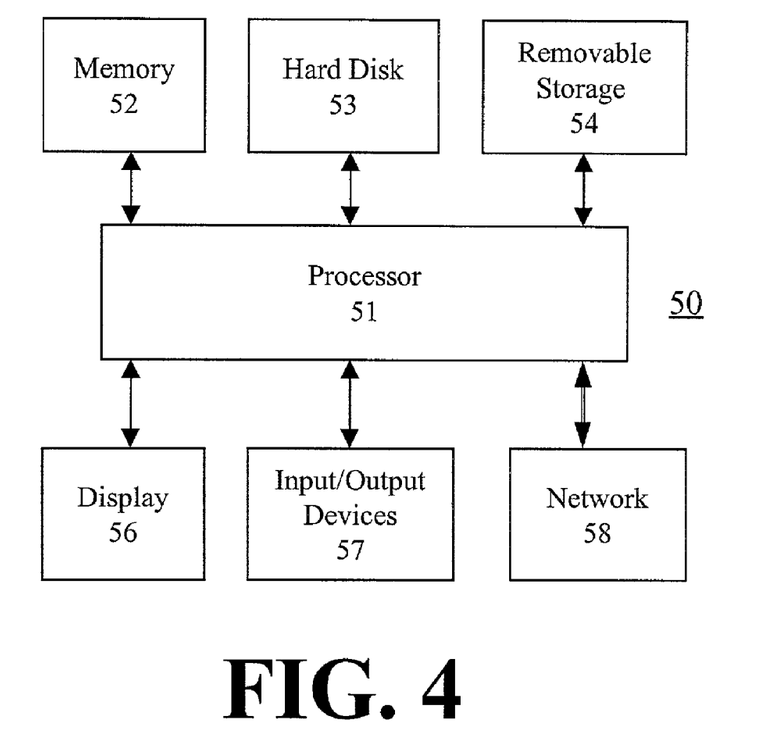
FIG. 4 shows a block diagram of a typical computing system/device that may be a target of a computer virus.

FIG. 4 illustrates a computer system or computer 50 on which the potentially infected program or file may be executed. Computer system 50 includes a processor 51, memory 52, hard disk 53, removable storage drive 54 (for reading/accessing removable storage media, such as floppy disks, CDs, DVDs, etc.), a display 56, I/O devices 57 (for example, keyboard, mouse, microphone, speaker, etc.), and a wired or wireless connection to a network 58. The network can be, for example, a LAN, a WAN, an intranet, an extranet, the Internet, and/or any combinations of such networks. Computer 50 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system").

Executable code in a program or file that may be infected with a virus may reside on/in, for example, hard disk 53 and/or a removable storage medium that may be read/accessed through removable storage drive 54. Also, the executable code may be downloaded to the system through network 58. When executable code is analyzed according to the methodologies described herein, the file or program that the executable code or portion of executable code being analyzed is from is also referred to herein as the "subject file", as noted above.

Typically, decryption of viral code in a subject file is triggered when the program is executed or the file is opened. When the subject file is downloaded through a network, the download process may include opening potentially infected file so that detecting viral code in this scenario is also preferred. The methodologies of the present application are capable of detecting viral code in either scenario described above, as well as other scenarios.

Since legitimately (i.e. not for purpose of concealing virus) encrypted files/programs usually involve encryption of the file/program as a whole, decryption of only a portion of a file/program is highly suspect and a sign that the file/program is likely infected with encrypted viral code. Once the encrypted code is detected, appropriate steps can be taken to confirm whether the encrypted code is viral and, if so, to remove the viral code before the viral code causes damage.

Figure 5:
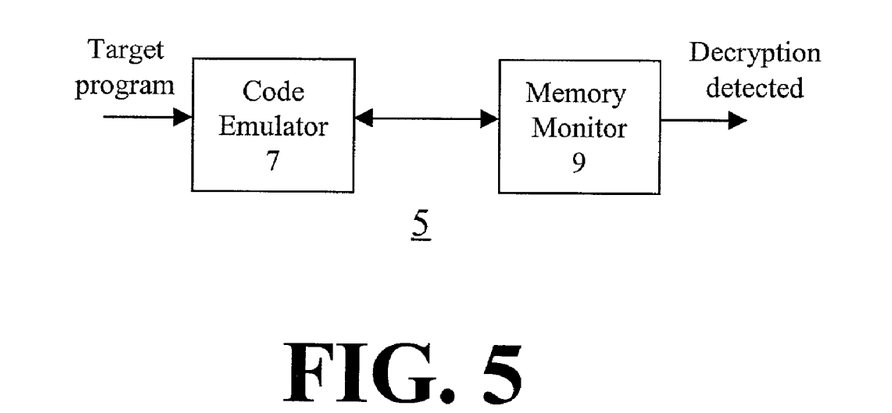
FIG. 5 shows a block diagram of an apparatus, according to an embodiment of the present disclosure, for detecting decryption of encrypted viral code.

The present disclosure provides an apparatus and methods for detecting decryption of encrypted viral code before the viral code can damage computing systems and/or infect other programs or files. An apparatus 5, according to an embodiment, is shown in FIG. 5. The apparatus 5 includes code emulator 7 and memory monitor 9. The code emulator 7 emulates computer executable code in a subject file, preferably, on an instruction-by-instruction basis, and supplies memory access information associated with the emulated code to the memory monitor 9. The memory monitor 9 monitors the memory access information for each instruction in the emulated code and determines whether decryption is taking place. By monitoring a state of computer memory, during emulation of the subject file, the apparatus can determine whether there is sequential or quasi-sequential decryption of code in a portion of the subject file. Decryption of encrypted code in the program file often may be manifested by iterations of a code loop comprising (i) read memory, (ii) decrypt and (ii) write memory. Thus, detection of decryption may be based primarily upon analysis of changes to memory.

Figure 1:
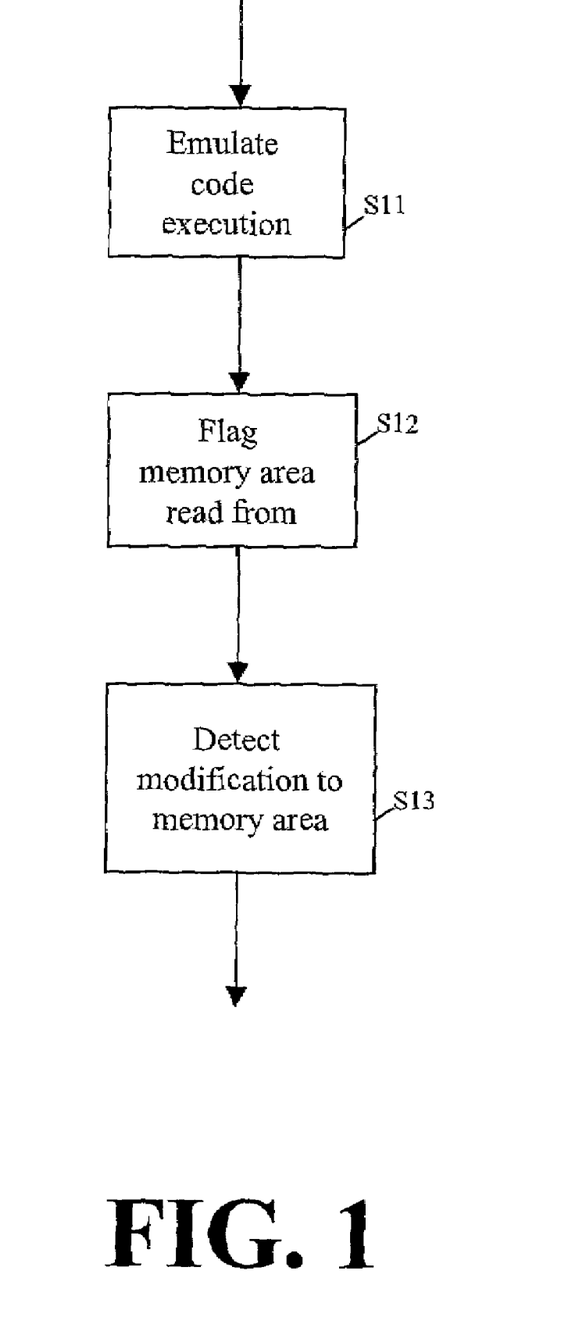
FIG. 1 shows a flow chart of a method according to an embodiment of the present disclosure for detecting decryption of encrypted viral code.

A method of detecting decryption of encrypted viral code, in accordance with an embodiment of the present disclosure, will be described with reference to FIGS. 1 and 5. Execution of code in a program or file is emulated by code emulator 7 (step S11). The memory monitor 9 monitors memory access during code emulation by the code emulator 7, and a memory area that is read during the emulation is flagged by memory monitor (step S12). Modification, by a subsequent emulated instruction, of the flagged memory area which was read also is detected by memory monitor 9 (step S13).

When each modification to memory in a group of memory accesses is to an area of memory that recently has been read, and the modifications are to sequential or quasi-sequential parts of the memory such that they form a region which is at least a predetermined size (e.g., a predetermined minimum length), then it can reliably be determined that decryption has been occurring. The memory region formed may be contiguous, evenly interspersed or otherwise quasi-contiguous.

A list of memory regions modified in the emulated code execution may be maintained. More specifically, the memory monitor 9 maintains, on an instruction-by-instruction basis, a list of regions in memory where "reads" followed by "writes" have occurred during emulated execution of code in a subject file. If a memory area which was read during code emulation is modified, then the modified memory area is compared with regions in the list to determine if the modified memory area is part of one of the listed regions. If not, a new region corresponding to the modified memory area is added to the list. On the other hand, if one of the listed regions overlaps with at least a part of the modified memory area, the listed region is updated to encompass the modified memory area. When one of the regions becomes large enough, e.g., it is of such a size that it is likely that decryption is taking place or has taken place during emulation so that detection of viral code is triggered, by for example an alarm, such as a graphic alarm on a display and/or an auditory alarm through a speaker.

Figure 2:
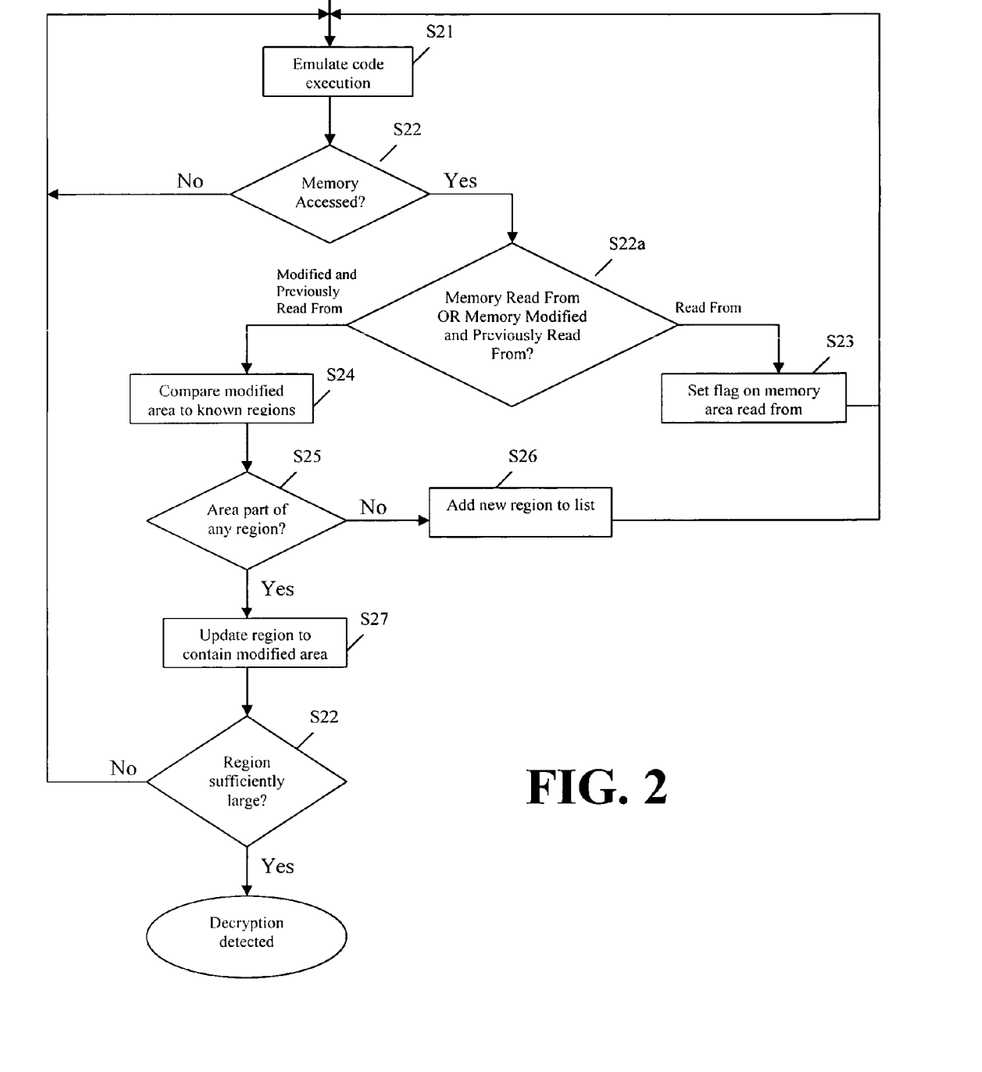
FIG. 2 shows a flow chart of a method according to another embodiment of the present disclosure for detecting decryption of encrypted viral code.

A method of detecting decryption of encrypted viral code, in accordance with this embodiment, will be described with reference to FIGS. 2 and 5. Computer executable code is emulated by the code emulator 7, preferably, one instruction at a time (step S21). The memory monitor 9 monitors the memory access information supplied by the code emulator 7 to determine whether an emulated instruction reads and/or modifies an area of memory. If memory monitor 9 determines that the emulated instruction neither reads from nor modifies an area of memory (NO, step S22), the process returns to step S21. If it is determined that an area of memory was read during emulation, the memory monitor 9 flags the area as having been read (step S23) and the process returns to step S21. If it is determined that the emulated instruction modified an area of memory and the area had been read previously, the memory monitor 9 scans through the list of regions it maintains and compares the modified memory area to the listed regions to determine if any of the listed regions overlaps at least a part of the modified memory area (step S24). If it is determined that the modified memory area is not part of any listed region (NO, step S25), then the memory monitor 9 adds the modified memory area as a new region to the list (step S26) and returns to step S21. However, if it is determined that the modified memory area overlaps an existing listed region (YES, step S25), the memory monitor 9 updates the dimensions of the memory region to encompass the modified memory area (step S27) and performs a check to determine if the size of the updated region is larger than a predetermined minimum size (step S28). If the size of the updated region is less than the predetermined minimum size (NO, step S28), then the process returns to step S21. If the size of the updated region is larger than the predetermined minimum size (YES, step S28), then decrypted code has been detected. The detection of decrypted code during the emulation triggers an alarm representing the detection of viral code.

According to another embodiment, if a memory area which was read during code emulation is modified, the modified memory area is compared to the list of memory regions, one memory region at a time. If the modified memory area is not contiguous with one of the memory regions, a new memory region is added to the list of memory regions. If the modified memory area is contiguous with one of the memory regions, then that memory region is updated to encompass the modified memory area. If the size of the updated memory region is larger than a predetermined minimum size, then decrypted code has been detected. The detection of decrypted code during the emulation triggers an alarm representing the detection of viral code.

Figure 3:
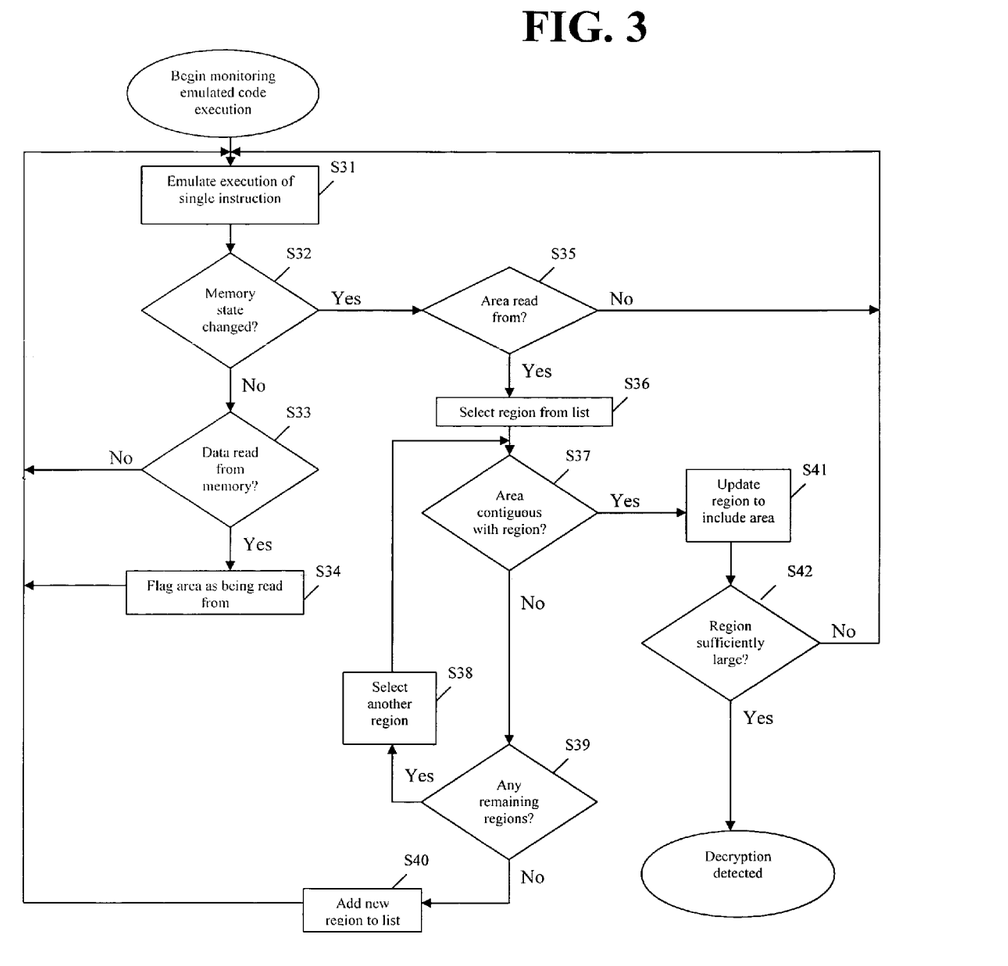
FIG. 3 shows a flow chart of a process according to a third embodiment of the present disclosure for detecting decryption of encrypted viral code.

A method of detecting decryption of encrypted viral code, in accordance with another embodiment, will be described with reference to FIGS. 3 and 5. Code execution is emulated by the code emulator, preferably, one instruction at a time (step S31). The memory monitor 9 monitors memory access information supplied by the code emulator 7 to determine whether an emulated instruction modifies an area of memory. If it is determined that the emulated instruction did not modify the memory state (NO, step S32), then the memory monitor 9 determines whether data was read from an area of memory for the emulated instruction (step S33). If data was not read from an area of memory for the emulated instruction (NO, step S33), then the process returns to step S31. If data was read from an area of memory for the emulated instruction (YES, step S33), then the memory monitor 9 flags the memory area as having been read (step S34) and the process returns to step S31.

If the memory monitor 9 determines that the emulated instruction modified the memory state (YES, step S32), then it is determined whether the modified memory area had been read previously (step S35). If it is determined that the modified memory area had not been read previously (NO, step S35), then the process returns to step S31. If it is determined that the modified memory area had been read previously (YES, step S35), then one region from a list of regions is selected (step S36) and the memory monitor determines whether the modified memory area is contiguous with the selected region (step S37). If it is determined that the modified memory area is not contiguous with the selected region (NO, step S37), the memory monitor 9 then determines whether another region is on the list (step S39). If it is determined that another region exists on the list of regions and has been selected (YES, step S39), then the next region on the list of regions is selected (step S38), and then the process returns to step S37 in which it is determined whether the area is contiguous with the next region. If it is determined that there are no remaining regions on the list (NO, step S39), then the area is added as a new region to the list (step S40) and the process returns to step S31.

If it is determined that the area is contiguous with the selected region (YES, step S37), then the region is updated to include the area (step S41). It is then determined whether the updated region is of a sufficient size to trigger detection (step S42). If the updated region is not large enough (NO, step S42), then the process returns to step S31. If the updated region is large enough (YES, step S42), then detection of decryption is triggered. In this way, detection of decrypted viral code is effected.

The apparatus and methods described above may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 4.

The viral code detection methodologies described herein may be performed by a computer in one or a combination of the following circumstances. The viral code detection methodologies may be performed periodically (e.g., once/twice per day) or at selected times (e.g., each time the computer is powered up or restarted) by the computer on all relevant electronic files. In addition, the viral code detection methodologies may be performed on a file (or a data stream received by the computer through a network) before the file is stored/copied/executed/opened on the computer.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";

(b) Ser. No. 60/218,333, filed Jul. 14, 2000 and entitled "DETECTION OF SUSPICIOUS PRIVILEGED ACCESS TO RESTRICTED COMPUTER RESOURCES";

(c) Ser. No. 60/218,926, filed Jul. 14, 2000 and entitled "DETECTION OF DECRYPTION TO IDENTIFY ENCRYPTED VIRUS";

(d) Ser. No. 60/218,922, filed Jul. 14, 2000 and entitled "DETECTION OF POLYMORPHIC VIRUS CODE USING DATAFLOW ANALYSIS";

(e) Ser. No. 60/218,467, filed Jul. 14, 2000 and entitled "DETECTION OF MALICIOUS CODE USING EMULATION OF OPERATING SYSTEM FUNCTIONS"; and (f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method for detecting decryption of encrypted viral code in a subject file, comprising:
   emulating computer executable code in a subject file;
   maintaining a list of memory regions that have been read and then modified during the emulation;
   flagging a memory area that is read during emulation of a first instruction in the computer executable code;
   detecting a modification to the flagged memory area during emulation of a second instruction in the computer executable code;
   updating the list of memory regions to include the modified flagged memory by:
      determining whether the modified flagged memory area overlaps a listed memory region of the listed memory regions; and
      if the modified flagged memory area overlaps the listed memory region, updating a dimension of the listed memory region to encompass the modified flagged memory area; and
      if the modified flagged memory area does not overlap the listed memory region, adding the modified flagged memory area as a new memory region to the list of memory regions;
   determining that one of the listed memory regions is larger than a predetermined size; and
   triggering a viral detection alarm in response to determining that one of the listed memory regions is larger than the predetermined size, the viral detection alarm indicating detection of viral code.

2. A program storage device readable by a machine, tangibly embodying a program of instructions executable by the machine to perform method steps for detecting decryption of encrypted viral code in a subject file, the method steps comprising:
   emulating computer executable code in a subject file;
   maintaining a list of memory regions that have been read and then modified during the emulation;
   flagging a memory area that is read during emulation of a first instruction in the computer executable code;
   detecting a modification to the flagged memory area during emulation of a second instruction in the computer executable code;
   updating the list of memory regions to include the modified flagged memory: by
      determining whether the modified flagged memory area overlaps a listed memory region of the listed memory regions; and
      if the modified flagged memory area overlaps the listed memory region, updating a dimension of the listed memory region to encompass the modified flagged memory area; and
      if the modified flagged memory area does not overlap the listed memory region, adding the modified flagged memory area as a new memory region to the list of memory regions;
   determining that one of the listed memory regions is larger than a predetermined size; and triggering a viral detection alarm in response to determining that one of the listed memory regions is larger than the predetermined size, the viral detection alarm indicating detection of viral code.

3. A computer system, comprising:
a processor; and
a program storage device readable by the computer system, tangibly embodying a program of instructions executable by the processor to perform method steps for detecting decryption of encrypted viral code in a subject file, the method steps including
emulating computer executable code in a subject file;
maintaining a list of memory regions that have been read and then modified during the emulation;
flagging a memory area that is read during emulation of a first instruction in the computer executable code;
detecting a modification to the flagged memory area during emulation of a second instruction in the computer executable code;
updating the list of memory regions to include the modified flagged memory: by
  determining whether the modified flagged memory area overlaps a listed memory region of the listed memory regions; and
  if the modified flagged memory area overlaps the listed memory region, updating a dimension of the listed memory region to encompass the modified flagged memory area; and
  if the modified flagged memory area does not overlap the listed memory region, adding the modified flagged memory area as a new memory region to the list of memory regions;
determining that one of the listed memory regions is larger than a predetermined size; and
triggering a viral detection alarm in response to determining that one of the listed memory regions is larger than the predetermined size, the viral detection alarm indicating detection of viral code.

4. An apparatus for detecting decryption of encrypted viral code in a subject file, comprising:
a processor; and
a storage device storing:
a code emulator, wherein the code emulator emulates computer executable code in a subject file, and outputs memory access information corresponding to the emulated computer executable code; and
a memory monitor, wherein the memory monitor monitors the memory access information output by the code emulator, maintains a list of memory regions that have been read and then modified during the emulation, flags a memory area that is read during the emulation of a first instruction in the computer executable code, detects a modification to the flagged memory area during emulation of a second instruction in the computer executable code, updates the list of memory regions to include the modified flagged memory by:
determining whether the modified flagged memory area overlaps a listed memory region of the listed memory regions; and
if the modified flagged memory area overlaps the listed memory region, updating a dimension of the listed memory region to encompass the modified flagged memory area; and
if the modified flagged memory area does not overlap the listed memory region, adding the modified flagged memory area as a new memory region to the list of memory regions;

the memory monitor further determines that one of the listed memory regions is larger than a predetermined size, and triggers a viral detection alarm in response to determining that one of the listed memory regions is larger than the predetermined size, the viral detection alarm indicating detection of viral code.

5. A storage medium which embodies instructions executable by a computer for detecting decryption of encrypted viral code in a subject file, comprising:
a first segment, including emulator code, wherein the emulator code emulates computer executable code in a subject file, and outputs memory access information corresponding to the emulated computer executable code; and
a second segment including memory monitor code, wherein the memory monitor code monitors the memory access information output by the code emulator, maintains a list of memory regions that have been read and then modified during the emulation, flags a memory area that is read during the emulation of a first instruction in the computer executable code, detects a modification to the flagged memory area during emulation of a second instruction in the computer executable code, updates the list of memory regions to include the modified flagged memory by:
determining whether the modified memory area overlaps a listed memory region of the listed memory regions; and
if the modified memory area overlaps the listed memory region, updating a dimension of the listed memory region to encompass the modified memory area; and
if the modified memory area does not overlap the listed memory region, adding the modified memory area as a new memory region to the list of memory regions;
the memory monitor code further determines that one of the listed memory regions is larger than a predetermined size, and triggers a viral detection alarm in response to determining that one of the listed memory regions is larger than the predetermined size, the viral detection alarm indicating detection of viral code.

6. A method of detecting encrypted viral code in a subject file, comprising:
emulating computer executable code in a subject file;
maintaining a list of memory regions that have been read and then modified during the emulation;
determining whether a memory area is read during emulation of a first instruction in the computer executable code and whether the memory area is modified during emulation of a second instruction in the computer executable code;
updating the list of memory regions to include the modified memory by:
  determining whether the modified memory area overlaps a listed memory region of the listed memory regions; and
  if the modified memory area overlaps the listed memory region, updating a dimension of the listed memory region to encompass the modified memory area; and
  if the modified memory area does not overlap the listed memory region, adding the modified memory area as a new memory region to the list of memory regions;
determining that one of the listed memory regions is larger than a predetermined size; and
triggering a viral detection alarm in response to determining that one of the listed memory regions is larger than the predetermined size, the viral detection alarm indicating detection of viral code.

7. The method of claim 6, wherein the emulation is performed on an instruction-by-instruction basis.

8. The method of claim 6, further comprising:
determining whether a selected one of the listed memory regions is contiguous with the modified memory area; and
updating the selected memory region to encompass the modified memory area.

9. A program storage device readable by a machine, tangibly embodying a program of instructions executable by the machine to perform method steps for detecting encrypted viral code in a subject file, the method steps comprising:
emulating computer executable code in a subject file;
maintaining a list of memory regions that have been read and then modified during the emulation;
determining whether a memory area is read during emulation of a first instruction in the computer executable code and whether the memory area is modified during emulation of a second instruction in the computer executable code;
updating the list of memory regions to include the modified memory by:
determining whether the modified memory area overlaps a listed memory region of the listed memory regions; and
if the modified memory area overlaps the listed memory region, updating a dimension of the listed memory region to encompass the modified memory area; and
if the modified memory area does not overlap the listed memory region, adding the modified memory area as a new memory region to the list of memory regions;
determining that one of the listed memory regions is larger than a predetermined size; and
triggering a viral detection alarm in response to determining that one of the listed memory regions is larger than the predetermined size, the viral detection alarm indicating detection of viral code.

10. A computer system, comprising:
a processor; and
a program storage device readable by the computer system, tangibly embodying a program of instructions executable by the computer system to perform method steps for detecting encrypted viral code, the method steps including
emulating computer executable code in a subject file;
maintaining a list of memory regions that have been read and then modified during the emulation;
determining whether a memory area is read during emulation of a first instruction in the computer executable code and whether the memory area is modified during emulation of a second instruction in the computer executable code;
updating the list of memory regions to include the modified memory: by
determining whether the modified memory area overlaps a listed memory region of the listed memory regions; and
if the modified memory area overlaps the listed memory region, updating a dimension of the listed memory region to encompass the modified memory area; and
if the modified memory area does not overlap the listed memory region, adding the modified memory area as a new memory region to the list of memory regions;
determining that one of the listed memory regions is larger than a predetermined size; and
triggering a viral detection alarm in response to determining that one of the listed memory regions is larger than the predetermined size, the viral detection alarm indicating detection of viral code.

11. An apparatus for detecting decryption of encrypted viral code in a subject file, comprising:
a processor; and
a storage device storing:
a code emulator, wherein the code emulator emulates computer executable code in a subject file, and outputs memory access information corresponding to the emulated computer executable code; and
a memory monitor, wherein the memory monitor monitors the memory access information output by the code emulator, maintains a list of memory regions that have been read and modified during emulation, determines whether a memory area is read during emulation of a first instruction in the computer executable code and whether the memory area is modified during emulation of a second instruction in the computer executable code, updates the list of memory regions to include the modified memory by:
determining whether the modified memory area overlaps a listed memory region of the listed memory regions; and
if the modified memory area overlaps the listed memory region, updating a dimension of the listed memory region to encompass the modified memory area; and
if the modified memory area does not overlap the listed memory region, adding the modified memory area as a new memory region to the list of memory regions;
the memory monitor further determines that one of the listed memory regions is larger than a predetermined size, and triggers a viral detection alarm in response to determining that one of the listed memory regions is larger than the predetermined size, the viral detection alarm indicating detection of viral code.

12. The apparatus of claim 11, wherein the code emulator performs the emulation on an instruction-by-instruction basis.

13. The apparatus of claim 11, wherein the memory monitor determines whether a selected one of the listed memory regions is contiguous with the modified memory area, and updates the selected memory region to encompass the modified memory area.

14. A storage medium which embodies instructions executable by a computer for detecting encrypted viral code in a subject file, comprising:
a first segment including emulator code, wherein the emulator code emulates computer executable code in a subject file, and outputs memory access information corresponding to the emulated computer executable code; and
a second segment including memory monitor code, wherein the memory monitor code monitors the memory access information output by the code emulator, maintains a list of memory regions that have been read and modified during emulation, determines whether a memory area is read during emulation of a first instruction in the computer executable code and whether the memory area is modified during emulation of a second instruction in the computer executable code, updates the list of memory regions to include the modified memory by:

determining whether the modified memory area overlaps a listed memory region of the listed memory regions; and if the modified memory area overlaps the listed memory region, updating a dimension of the listed memory region to encompass the modified memory area; and if the modified memory area does not overlap the listed memory region, adding the modified memory area as a new memory region to the list of memory regions;

the memory monitor code further determines that one of the listed memory regions is larger than a predetermined size, and triggers a viral detection alarm in response to determining that one of the listed memory regions is larger than the predetermined size, the viral detection alarm indicating detection of viral code.

* * * * *